United States Patent [19]

Sakurada et al.

[11] Patent Number: 4,604,654

[45] Date of Patent: Aug. 5, 1986

[54] IMAGE FORMING METHOD AND APPARATUS

[75] Inventors: Nobuaki Sakurada, Yokohama; Yoshitaka Watanabe; Hideaki Kawamura, both of Tokyo; Yuichi Sato, Kawasaki, all of Japan

[73] Assignee: Canon Kabushiki Kaisha, Tokyo, Japan

[21] Appl. No.: 758,851

[22] Filed: Jul. 26, 1985

Related U.S. Application Data

[63] Continuation of Ser. No. 514,592, Jul. 18, 1983, abandoned.

[30] Foreign Application Priority Data

Jul. 23, 1982 [JP] Japan ................................. 57-128541
Jul. 23, 1982 [JP] Japan ................................. 57-128542
Jul. 23, 1982 [JP] Japan ................................. 57-128543
Jul. 23, 1982 [JP] Japan ................................. 57-128553

[51] Int. Cl.$^4$ ............................................. H04N 1/40
[52] U.S. Cl. .................................... 358/298; 346/1.1; 346/140 R; 358/75; 358/283
[58] Field of Search ............................ 346/1.1, 75, 140; 358/75, 283, 296, 298

[56] References Cited

U.S. PATENT DOCUMENTS

| | | | |
|---|---|---|---|
| 1,656,338 | 1/1928 | Ranger | 358/283 X |
| 1,790,723 | 2/1931 | Ranger | 358/283 X |
| 1,817,098 | 8/1931 | Ranger | 358/283 X |
| 3,197,558 | 7/1965 | Ernst | 358/283 |
| 3,681,650 | 8/1972 | Koll | 358/283 X |
| 3,683,212 | 8/1972 | Zoltan | 346/140 X |
| 3,739,084 | 6/1973 | Heinrich | 358/283 |
| 3,747,120 | 7/1973 | Stemme | 346/140 X |
| 3,864,696 | 2/1975 | Fischbeck | 346/140 |
| 3,977,007 | 8/1976 | Berry et al. | 346/1 |
| 4,050,077 | 9/1977 | Yamada | 346/75 |
| 4,339,774 | 7/1982 | Temple | 358/283 |
| 4,342,051 | 7/1982 | Suzaki | 358/283 |
| 4,353,079 | 10/1982 | Kawanabe | 346/140 |
| 4,368,491 | 1/1983 | Saito | 358/283 |
| 4,389,712 | 6/1983 | Frattarola et al. | 365/127 |
| 4,394,693 | 7/1983 | Shirley | 358/283 |
| 4,403,874 | 9/1983 | Payne | 358/78 X |
| 4,413,275 | 11/1983 | Horiuchi | 358/75 |
| 4,468,706 | 8/1984 | Cahill | 358/283 X |
| 4,547,812 | 10/1985 | Waller | 358/298 X |

Primary Examiner—Joseph W. Hartary
Attorney, Agent, or Firm—Fitzpatrick, Cella, Harper & Scinto

[57] ABSTRACT

An image forming method comprises the steps of providing pattern elementary marks which provide an image pattern, controlling the size of the pattern elementary marks, and forming the pattern elementary marks substantially at equal intervals. The controlling step is such that use is made preferentially of the pattern elementary marks in an area wherein the variation in density gradient level relative to the variation in size of the pattern elementary marks is great. An apparatus for carrying out such method is provided.

7 Claims, 31 Drawing Figures

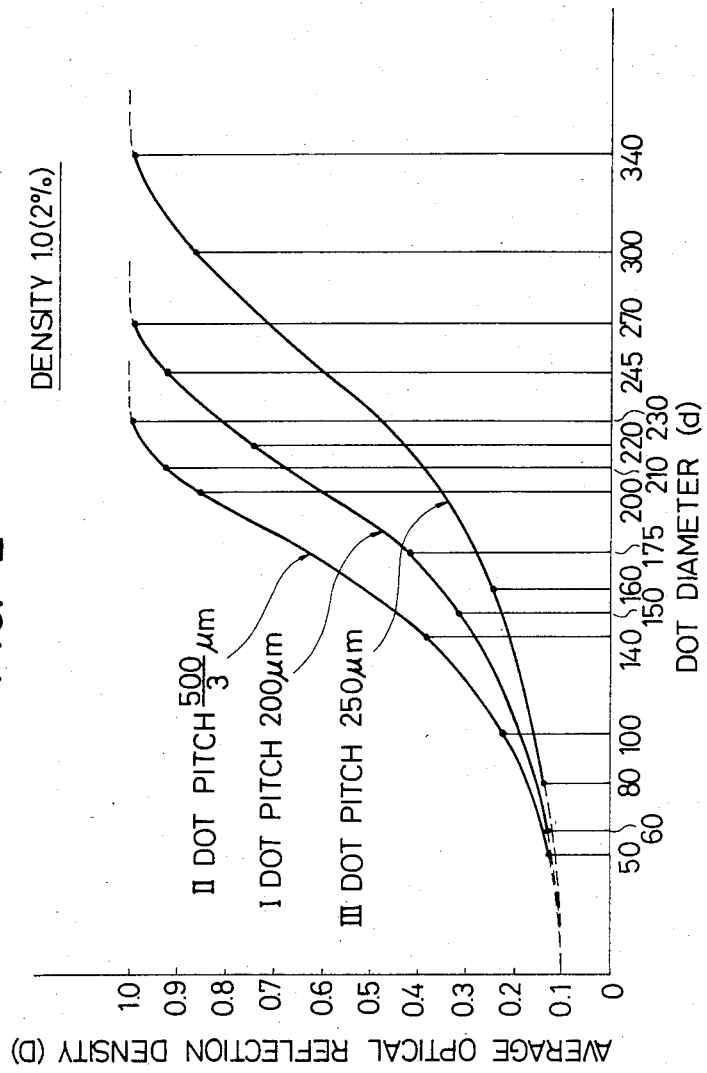

FIG. 10

| INPUT (FROM MC) | | | | | | OUTPUT (TO DAC) | | | | | | HS | HEAD APPLIED VOLTAGE (V) | HEAD FOR USE | AVERAGE OPTICAL REFLECTION DENSITY |
|---|---|---|---|---|---|---|---|---|---|---|---|---|---|---|---|
| MSB | | | | | LSB | MSB | | | | | LSB | | | | |
| 0 | 0 | 0 | 0 | 0 | 0 | 0 | 1 | 1 | 1 | 1 | 1 | 0 | 31 | H1 | 0.14 |
| 0 | 0 | 0 | 0 | 1 | 0 | 1 | 0 | 0 | 0 | 1 | 1 | 0 | 35 | H1 | |
| 0 | 0 | 0 | 1 | 0 | 0 | 1 | 0 | 0 | 1 | 0 | 1 | 0 | 39 | H1 | |
| 0 | 0 | 0 | 1 | 1 | 0 | 1 | 0 | 1 | 0 | 1 | 1 | 0 | 43 | H1 | |
| 0 | 0 | 1 | 0 | 0 | 0 | 1 | 1 | 0 | 0 | 0 | 0 | 0 | 48 | H1 | |
| 0 | 0 | 1 | 0 | 1 | 0 | 1 | 1 | 0 | 1 | 0 | 1 | 0 | 53 | H1 | |
| 0 | 0 | 1 | 1 | 0 | 0 | 1 | 1 | 1 | 0 | 1 | 0 | 0 | 58 | H1 | |
| 0 | 0 | 1 | 1 | 1 | 0 | 1 | 1 | 1 | 1 | 1 | 1 | 0 | 63 | H1 | |
| 0 | 1 | 0 | 0 | 0 | 1 | 0 | 0 | 0 | 1 | 0 | 0 | 0 | 68 | H1 | |
| 0 | 1 | 0 | 0 | 1 | 1 | 0 | 0 | 1 | 0 | 0 | 1 | 0 | 73 | H1 | |
| 0 | 1 | 0 | 1 | 0 | 1 | 0 | 0 | 1 | 1 | 1 | 1 | 0 | 79 | H1 | |
| 0 | 1 | 0 | 1 | 1 | 1 | 0 | 1 | 0 | 1 | 0 | 1 | 0 | 85 | H1 | |
| 0 | 1 | 1 | 0 | 0 | 1 | 0 | 1 | 1 | 0 | 1 | 1 | 0 | 91 | H1 | |
| 0 | 1 | 1 | 0 | 1 | 1 | 1 | 0 | 0 | 0 | 1 | 0 | 0 | 98 | H1 | |
| 0 | 1 | 1 | 1 | 0 | 1 | 0 | 0 | 0 | 1 | 1 | 0 | 1 | 70 | H2 | 0.51 |
| 0 | 1 | 1 | 1 | 1 | 1 | 0 | 0 | 1 | 0 | 0 | 0 | 1 | 72 | H2 | |
| 1 | 0 | 0 | 0 | 0 | 1 | 0 | 0 | 1 | 0 | 1 | 0 | 1 | 74 | H2 | |
| 1 | 0 | 0 | 0 | 1 | 1 | 0 | 0 | 1 | 1 | 0 | 0 | 1 | 76 | H2 | |
| 1 | 0 | 0 | 1 | 0 | 1 | 0 | 0 | 1 | 1 | 1 | 0 | 1 | 78 | H2 | |
| 1 | 0 | 0 | 1 | 1 | 1 | 0 | 1 | 0 | 0 | 0 | 1 | 1 | 81 | H2 | |
| 1 | 0 | 1 | 0 | 0 | 1 | 0 | 1 | 0 | 1 | 0 | 0 | 1 | 84 | H2 | |
| 1 | 0 | 1 | 0 | 1 | 1 | 0 | 1 | 0 | 1 | 1 | 1 | 1 | 87 | H2 | |
| 1 | 0 | 1 | 1 | 0 | 1 | 0 | 1 | 1 | 0 | 1 | 0 | 1 | 90 | H2 | |
| 1 | 0 | 1 | 1 | 1 | 1 | 0 | 1 | 1 | 1 | 0 | 1 | 1 | 93 | H2 | |
| 1 | 1 | 0 | 0 | 0 | 1 | 1 | 0 | 0 | 0 | 0 | 1 | 1 | 97 | H2 | |
| 1 | 1 | 0 | 0 | 1 | 1 | 1 | 0 | 0 | 1 | 0 | 0 | 1 | 100 | H2 | |
| 1 | 1 | 0 | 1 | 0 | 1 | 1 | 0 | 1 | 0 | 0 | 0 | 1 | 104 | H2 | |
| 1 | 1 | 0 | 1 | 1 | 1 | 1 | 0 | 1 | 1 | 0 | 0 | 1 | 108 | H2 | |
| 1 | 1 | 1 | 0 | 0 | 1 | 1 | 1 | 0 | 0 | 0 | 0 | 1 | 112 | H2 | |
| 1 | 1 | 1 | 0 | 1 | 1 | 1 | 1 | 0 | 1 | 0 | 0 | 1 | 116 | H2 | |
| 1 | 1 | 1 | 1 | 0 | 1 | 1 | 1 | 1 | 0 | 0 | 0 | 1 | 120 | H2 | |
| 1 | 1 | 1 | 1 | 1 | 1 | 1 | 1 | 1 | 1 | 0 | 1 | 1 | 125 | H2 | 1.21 |

IMAGE FORMING METHOD AND APPARATUS

This application is a continuation of application Ser. No. 514,592 filed July 18, 1983, now abandoned.

BACKGROUND OF THE INVENTION

1. Field of the Invention

This invention relates to a method of and an apparatus for forming images such as half-tone images or colored images, and more particularly to an image forming method and apparatus for forming images by using a number of micro-area dots (or pattern elementary marks).

The term "dots" (pattern elementary marks) used herein refers to what accords with forming marks of a minimum unit forming an image pattern such as a picture, a character, a figure or a graph, for example, recorded dots on a recording medium in dot recording. Incidentally, in image formation, it is to be understood that where one picture element is formed by one pattern elementary mark, the pattern elementary mark and the picture element accord with each other, but where one picture element is formed by a plurality of pattern elementary marks, the pattern elementary marks and the picture element are different.

2. Description of the Prior Art

For example, in the ink jet type dot recording wherein colored ink droplets are discharged to form ink dots on a recording medium (such as paper, plastics or ceramics) to thereby effect recording and formation of patterns such as images, it has already been proposed to effect recording with the size (for example, dot diameter) of colored ink dots on the recording medium varied for the reproduction of density gradients or tones. Particularly, in an ink jet recording system using a piezo element, it is relatively easy to take the correspondence between a voltage applied to the piezo element and the size of the diameter of the ink dots on the recording medium controlled by the applied voltage and accordingly, the control of gradient levels can be easily accomplished by controlling the dot diameter through a relatively simple control circuit.

Now, when control of the gradient level of a pattern is made by controlling the diameter of the ink dots, namely, the size of the pattern elementary marks, examination of the variation in gradient level of the pattern (for example, the variation in average optical reflection density of the formed pattern portion) relative to the variation in size of the pattern elementary marks reveals that there exists an area in which a relatively great variation in gradient level occurs relative to the variation in size of the pattern elementary marks and an area in which the gradient level is not so much varied.

This will now be analyzed with respect to the relation between the optical reflection density Dd of a dot and the number of dots arranged per 1 mm in one-dimensional direction (hereinafter referred to as the PEL number) in a case where a colored dot having an optical reflection density Dd (reflection factor $Ad = 10^{-Dd}$) is used on a material (a recording medium such as paper) having an optical reflection density $D_0$ (reflection factor $A_0 = 10^{-D_0}$) and the diameter d of the dot is varied to thereby vary the average optical reflection density D (reflection factor $A = 10^{-D}$) per unit area (1 mm square) of the pattern portion formed by the dot. First, assuming that dots are uniformly arranged at a pitch $T(=1/n)$ on the above-mentioned material, then the reflection factor A of the pattern portion per unit area is:

$$A = \left\{ A_0 \left( T^2 - \frac{\pi d^2}{4} \right) + Ad \cdot \frac{\pi d^2}{4} \right\} / \frac{\pi d^2}{4} \quad (1)$$

$$= A_0 \left( \frac{4T^2}{\pi d^2} - 1 \right) + Ad$$

Accordingly, the average optical reflection density D in this case may be expressed as follows. In the following, "log" indicates common logarithms whose base is 10.

$$D = -\log \left\{ A_0 \left( 1 - \frac{n^2 d^2}{4} \right) + \frac{\pi}{4} \cdot Ad \cdot n \cdot d^2 \right\} \quad (2)$$

$$= -\log \left\{ A_0 + \frac{\pi}{4} (Ad - A_0) \cdot \frac{d^2}{T^2} \right\}$$

For example, where a pattern is formed on a material (such as white paper) having an optical reflection density $D_0 = 0.1$ by a colored dot having an optical reflection density $Dd = 1.0$, the average optical reflection density D of the pattern portion per unit area is given as follows by equation (2) above, and this is graphically shown by curve I in FIG. 1 of the accompanying drawings.

$$D = -\log \left( 0.794 - 0.542 \frac{d^2}{T^2} \right)$$

In FIG. 1, the abscissa represents the dot duty ratio d/T in one-dimensional direction and the ordinate represents the average optical reflection density D. Also, in FIG. 1, curves II and III show the cases where the dot optical reflection density is 1.4 and 0.6, respectively. If the diameter d of dot becomes greater and exceeds a pitch T, that is, if the duty ratio d/T exceeds 1.0, adjacent dots overlap each other and therefore, the average optical reflection density D begins to be gradually saturated relative to the variation in the dot diameter d and in calculation, becomes completely saturated at $d = \sqrt{2T}$. Incidentally, as regards the curves I, II and III of FIG. 1, the optical reflection density $Dd = 1.6$, 1.4 and 0.6 respectively correspond to colored inks containing 2.0%, 4.5% and 0.5% (all by weight) of dye or pigment, respectively.

FIG. 1 shows the manner of variation in the average optical reflection density D of the formed pattern relative to the variation in the duty ratio d/T of dot with respect to colored dots having a constant dot pitch T and different optical reflection densities Dd, and if equation (2) above is used to show the manner of variation in the average optical reflection density D of the formed pattern relative to the variation in the duty ratio d/T of dot with respect to colored dots having a constant optical reflection density Dd and different dot pitches T, it will be as shown in FIG. 2 of the accompanying drawings. In FIG. 2, curves I, II and III show the manner of variation in the average optical reflection density D of the pattern relative to the variation in dot diameter d in the cases where the optical reflection density Dd of dot is 1.0 and the dot pitches T (and PEL numbers) are 200 μm (5 PEL), 500/3 μm (6 PEL) and 250 μm (4 PEL), respectively.

The curves in FIGS. 1 and 2 were all obtained from the values calculated by equation (2) above, but as an actual measuring method, the optical reflection density of the pattern forming material (for example, the above-mentioned ink) is obtained as by uniformly applying the pattern forming material to an area of 10 mm square and measuring it by a commercially available densitometer, and the average optical reflection density of the pattern portion is obtained as by measuring the pattern portion formed by pattern elementary marks arranged in an area of 10 mm square, by the use of a densitometer. Actually, in either case, a reference value of measurement may be determined in advance by the use of standard white paper or the like having a reflection density of about 0.1.

Now, as will be appreciated from the various curves shown in FIGS. 1 and 2, when an attempt is made to obtain a variation in gradient level (average optical reflection density) of the formed pattern by varying the dot diameter, i.e., the pattern elementary mark size, the variation in gradient level of the pattern relative to the variation in size of the pattern elementary marks is not uniform and particularly, in an area wherein the size of the pattern elementary marks is small and an area wherein the size of the pattern elementary marks is large, the gradient level of the pattern is not so much varied relative to the variation in size of the pattern elementary marks. As will be understood from FIGS. 1 and 2, this is a phenomenon equally noted irrespective of the optical reflection density (coloring density) of the pattern elementary marks themselves and irrespective of the arrangement pitch of the pattern elementary marks. Thus, the area in which the variation in gradient level of the pattern is small relative to the variation in size of the pattern elementary marks is an area very inefficient to obtain a predetermined variation in gradient level.

With regard to the reproduction of density gradient, the following methods have heretofore been proposed.

A first method is to control the amount of liquid discharged from an ink jet head to thereby vary the diameter of dots printed and express gradient.

A second method is to construct a picture element by a matrix comprising, for example, 4×4 micro picture elements without changing the dot diameter and use the dither method for this matrix to reproduce density gradients. With the first method, however, it is difficult to secure a great range from the minimum dot diameter to the maximum dot diameter and reproduction of only several tones is possible. Accordingly, this method has been unsatisfactory for printing-out of television images or photographic images.

The second method overcomes the disadvantage of the first method and with this method, it is possible to reproduce seventeen tones of gradient, for example, in case a picture element is constructed by 4×4 matrix. In this method, however, as compared with the first method, the printing speed is reduced by 1/16 because a picture element is constructed by 16 elementary marks or it is necessary to achieve a higher printing speed by increasing the number of printing heads 16 times. This not only has rendered the construction of the printing head complex, but also has led to increased sizes in the electric circuits for image processing by the dither method and accordingly to a greatly increased cost for such apparatus.

SUMMARY OF THE INVENTION

In view of the above-noted situation, the present invention has for its first object to provide, with a pattern forming method in which the gradient level of a pattern is controlled by controlling the size of pattern elementary marks which provide the origin of image pattern formation, a useful image forming method and apparatus in which very efficient and effective control of the gradient level of image patterns can be accomplished, whereby more faithful reproduction of gradient (picture tone) can be achieved.

A second object of the present invention is to provide an image forming apparatus which is simple in construction and moreover capable of reproducing a wide density range.

A third object of the present invention is to provide an image forming apparatus which solves various problems which may arise in case of using a plurality of recording heads having, for example, different recording densities or different recording dot diameters, i.e., different density characteristics.

Other objects of the present invention will become apparent from the following detailed description and the accompanying drawings.

BRIEF DESCRIPTION OF THE DRAWINGS

FIGS. 1 and 2 are graphs of the dot duty ratio versus average reflection density characteristic and the dot diameter versus average reflection density characteristic, respectively, showing the manner of variation in the average reflection density of a formed pattern relative to the variation in size of pattern elementary marks (dots) with respect to the different densities and different pitches of the pattern elementary marks (dots).

FIG. 10 shows the relation of the input digital value of the matrix circuit MXC to the output code, the selected head and the reflection density.

DESCRIPTION OF THE PREFERRED EMBODIMENTS

Embodiments which will hereinafter be shown are examples in which the present invention is applied to ink jet recording, but the present invention is widely applicable to so-called dot recording. Accordingly, of course, the present invention is not limited to the ink jet recording hereinafter shown as the embodiments, but is widely applicable to various types of dot recording such as thermosensitive recording, thermosensitive transfer recording, wire dot recording, electrostatic recording, etc. in which recording is accomplished by dot formation.

Figure 1:
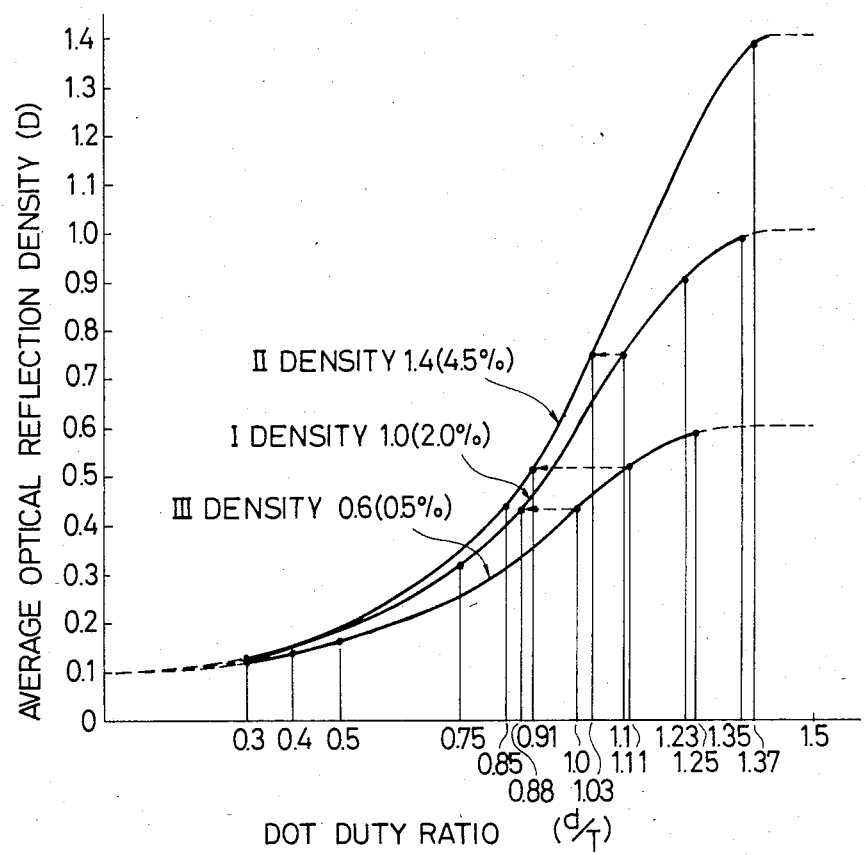

Referring first to FIG. 1, curve I shows the manner of variation in the average optical reflection density of a pattern relative to the variation in the dot duty ratio when dot formation is carried out by the use of ink (containing 2.0% in weight of dye or pigment) whose optical reflection density (coloring density) is 1.0. As will be seen from FIG. 1, the variation in the average reflection density of pattern is very small particularly in an area wherein the duty ratio of dot is less than about 0.3 and an area wherein the duty ratio of dot is greater than about 1.35. Likewise, as regards curve II which shows a case where use is made of ink (containing 4.5% in weight of dye or pigment) whose reflection density is 1.4, the variation in the average reflection density of pattern is very small in an area wherein the duty ratio of dot is less than about 0.3 and an area wherein the duty ratio of dot is greater than about 1.37. Further likewise, as regards curve III which shows a case where use is made of ink (containing 0.5% by weight of dye or pigment) whose reflection density is 0.6, the variation in the average reflection density of pattern is very small in an area wherein the dot duty ratio in less than about 0.3 and an area wherein the dot duty ratio is greater than about 1.25. From such a fact, according to the present invention, it is advocated to use, as the area useful for varying the dot size, an area in which the dot duty ratio is about 0.3 to about 1.25 (preferably about 0.75 to about 1.23, and more preferably about 0.88 to about 1.1) for the ink of reflection density 1.0, an area in which the dot duty ratio is about 0.3 to about 1.37 (preferably about 0.85 to about 1.37, and more preferably about 0.91 to about 1.37) for the ink of reflection density 1.4, and an area in which the dot duty ratio is about 0.3 to about 1.25 (preferably about 0.4 to about 1.11, and more preferably about 0.5 to about 1.0) for the ink of reflection density 0.6. For example, where an attempt is made to effect image design or the like by the use of high density ink whose reflection density is 1.4 and low density ink whose reflection density is 0.6, it is possible to substantially continuously cover the range of about 0.12 to about 1.38 as the average optical reflection density of the pattern by using an area of curve III in which the dot duty ratio is about 0.3 to about 1.11 for the low density ink and an area of curve II in which the dot duty ratio is about 0.91 to about 1.37 for the high density ink, with the change-over point of about 0.51 in terms of the average optical reflection density of the pattern, and connecting these areas in the average optical reflection density of the pattern, and where medium density ink whose reflection density is 0.6 is used in addition to the above-described two types of ink, it is likewise possible to substantially continuously cover the range of about 0.12 to about 1.38 as the average reflection density of pattern by using an area of curve III in which the dot duty ratio is about 0.3 to about 1.0 for the low density ink, an area of curve I in which the dot duty ratio is about 0.88 to about 1.1 for the medium density ink and an area of curve II in which the dot duty ratio is about 1.03 to about 1.37 for the high density ink, with the change-over points of about 0.43 and about 0.75 in terms of the average reflection density of the pattern, and connecting these areas in the average reflection density of the pattern and thus, it becomes possible to effect very efficient and effective reproduction of density gradient under simpler control in image design or the like.

Referring now to FIG. 2, curves I, II and III shows the manner of variation in the average optical reflection density relative to the variation in dot diameter when dot formation is effected by the use of ink (containing 2.0% in weight of dye or pigment) whose optical density is 1.0 and with dot pitches being 200 μm (5 PEL), 500/3 μm (6 PEL) and 250 μm (4 PEL). As will be seen from FIG. 2, where the dot pitch is 200 μm (curve I), the variation in the average reflection density of the pattern is very small in an area wherein the dot diameter is less than about 60 μm and an area wherein the dot diameter is greater than about 270 μm. Likewise, where the dot pitch is 500/3 μm (curve II), the variation in the average reflection density of the pattern is very small in an area wherein the dot diameter is less than about 50 μm and an area wherein the dot diameter is greater than about 230 μm. Further likewise, where the dot pitch is 250 μm (curve III), the variation in the average reflection density of the pattern is very small in an area wherein the dot diameter is less than about 80 μm and an area wherein the dot diameter is greater than about 340 μm. From such a fact, according to the present invention, when ink of reflection density 1.0 is used, it is advocated to use an area of curve I in which the dot diameter is about 60 μm to about 270 μm (preferably about 150 μm to about 245 μm, and more preferably about 175 μm to about 220 μm) in the case of the dot pitch 200 μm, an area of curve II in which the dot diameter is about 50 μm to about 230 μm (preferably about 100 μm to about 210 μm, and more preferably about 140 μm to about 200 μm) in the case of the dot pitch 500/3 μm, and an area of curve III in which the dot diameter is about 80 μm to about 340 μm (preferably about 160 μm to about 300 μm, and more preferably about 200 μm to about 270 μm) in the case of the dot pitch 250 μm. Use is made of an area in which the ratio of the dot diameter to the distance between the dots (dot pitch) (that is the duty ratio) is less than 1.4, preferably less than 1.25.

With the foregoing description in view, description will hereinafter be made of a specific example of the apparatus to which the present invention is applied.

Figure 3A:
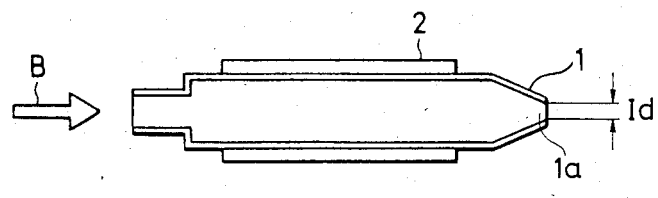
FIG. 3A is a cross-sectional view of an ink jet head.
Figure 3B:
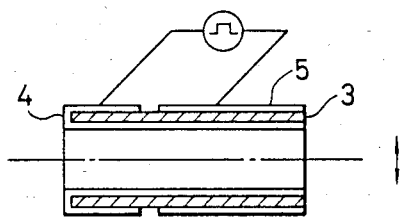
FIG. 3B is a cross-sectional view of a piezo vibrator.

Referring to FIG. 3, it shows an ink jet head comprising means for obtaining flying dots of the above-described ink. In FIG. 3, reference numeral 1 designates a glass tube having a pointed end, and reference numeral 2 denotes a piezo vibrator circumscribing the glass tube 1. Reference numeral 3 designates a tubular piezo element, and reference numerals 4 and 5 denote electrodes. Contraction and recovery of the glass tube 1 in the direction of the inner diameter thereof are effected by applying a pulse-like voltage between the electrodes 4 and 5. By supplying ink at this time in the direction of arrow B, droplets of ink can be discharged from an orifice portion 1a at the pointed end of the glass tube 1. Also, it is possible to vary the size of the discharged droplets of ink by varying the magnitude of the voltage applied to the piezo element 3 and, in our experiment, the ink dot diameter could be varied within the range of about three times. However, a variation of three times in diameter results in a variation of about nine times in area ratio and is unsatisfactory as the reproduction of gradient intended for the image expression.

Figure 4:
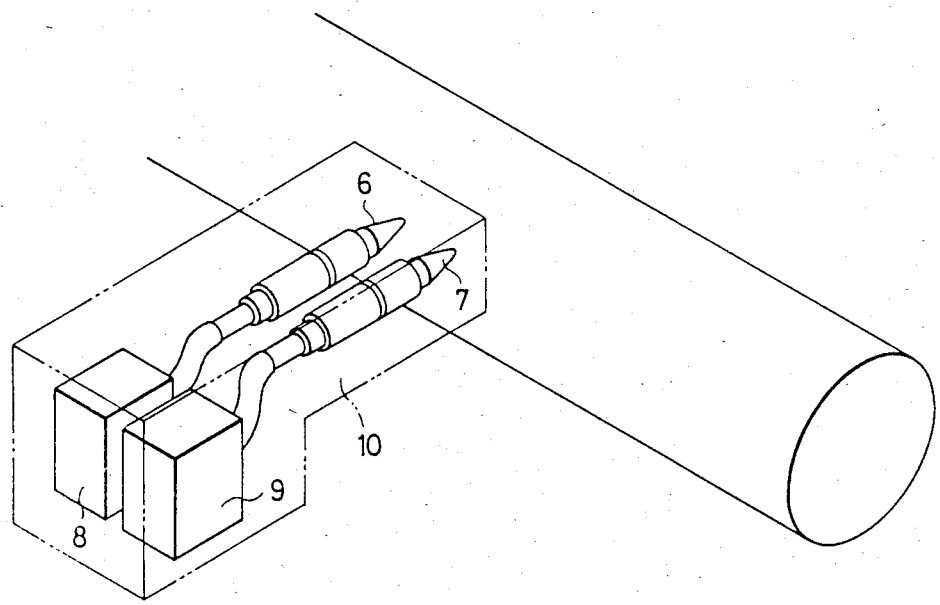
FIG. 4 shows the construction of ink jet heads.

For this reason, as shown in FIG. 4, in ink jet head unit 10 has been constructed which uses two heads 6 and 7 and which is provided with ink tanks 8 and 9 containing therein inks of different densities.

Figure 5:
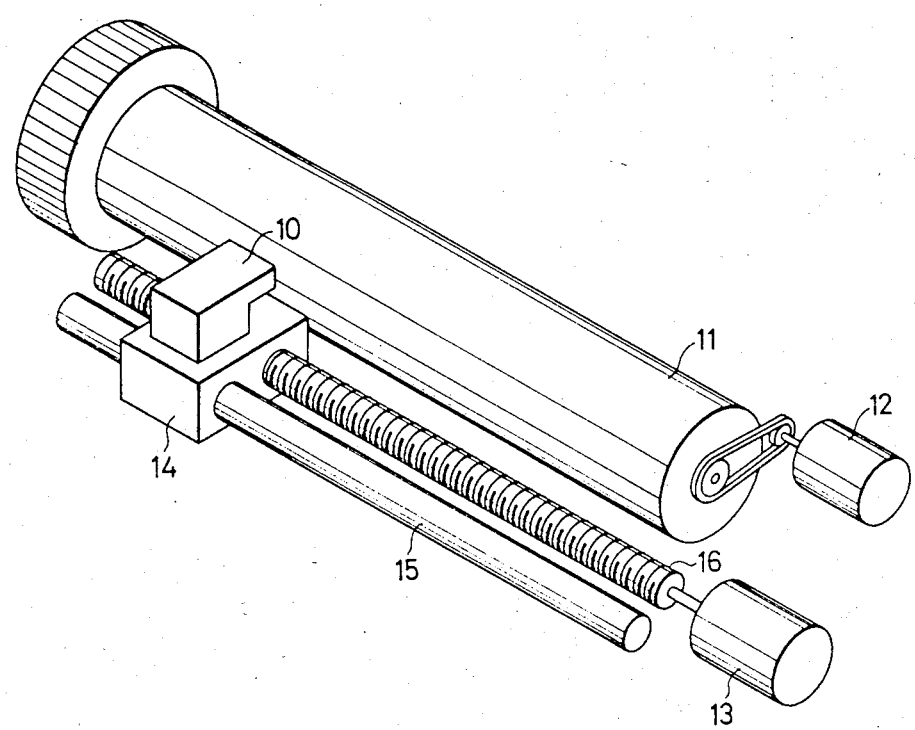
FIG. 5 is a perspective view of a recording apparatus to which the heads of FIG. 4 are applied.

FIG. 5 shows the construction of the mechanical portion of a printer on which the head unit 10 of FIG. 4 is mounted. In FIG. 5, reference numeral 11 designates a platen, reference numeral 12 denotes a paper feeding pulse motor, and reference numeral 13 designates a motor for scanning a head carriage 14 having the head unit 10 mounted thereon by a guide 15 and a screw 16.

Figure 6:
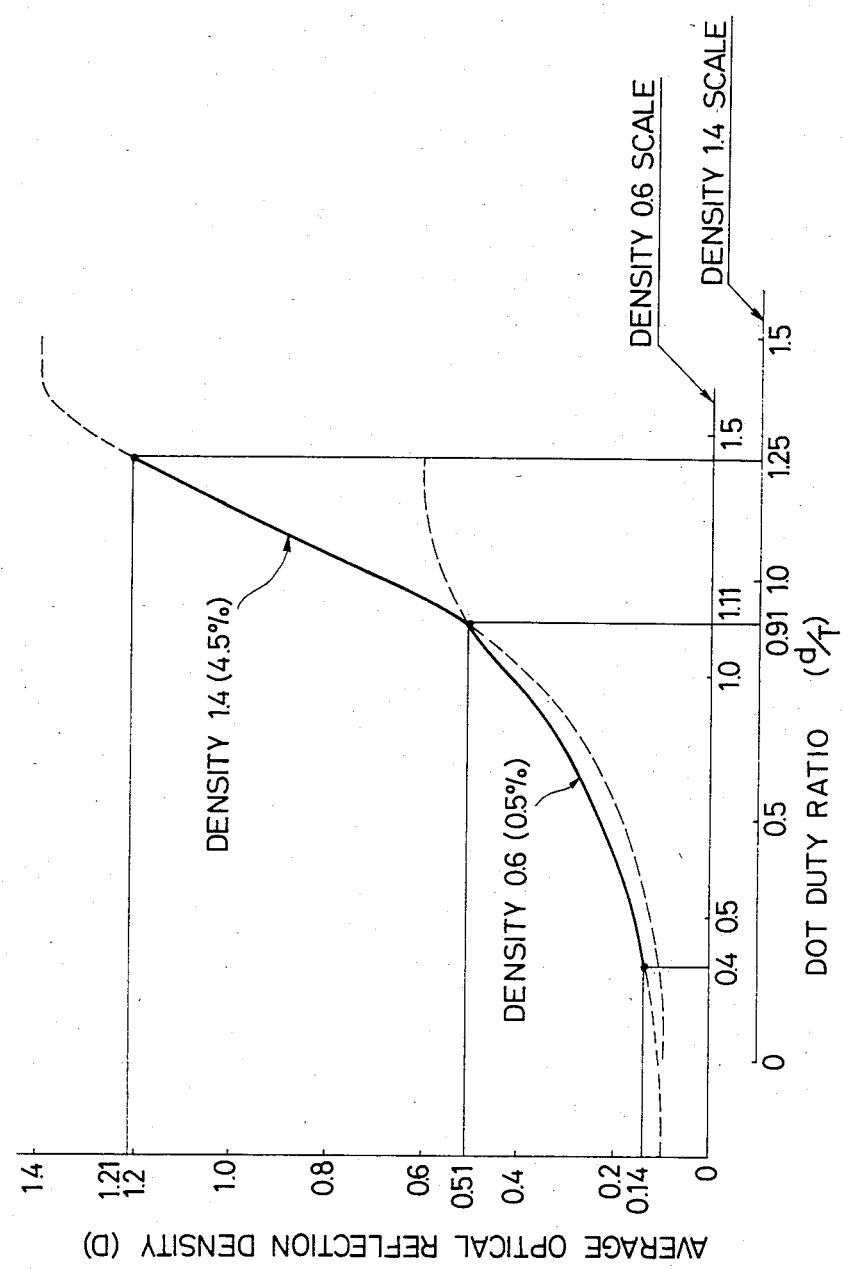
FIG. 6 is a graph of the dot duty ratio versus average reflection density characteristic in an embodiment wherein the present invention is applied to the apparatus of FIG. 5.

A characteristic as shown in FIG. 6 could be obtained by forming dots at a pitch of 200 $\mu$m (5 PEL) by the use of the ink jet device of FIGS. 4 and 5. In FIG. 6, the ordinate represents the average optical reflection density of the formed pattern and the abscissa represents the dot duty ratio. The density of the ink used was 1.4 for high density ink (containing 4.5% in weight of dye or pigment) and 0.6 for low density ink (containing 0.5% in weight of dye or pigment). In view of what has been previously described in connection with FIG. 1, with the point of about 0.51 in terms of the average reflection density of pattern as the change-over point as indicated by solid line in FIG. 6, the area of variation in dot diameter in which the dot duty ratio is about 0.4 to about 1.11 has been used for low density ink and the area of variation in dot diameter in which the dot duty ratio is about 0.91 to about 1.25 has been used for high density ink and these areas have been connected together at the point of about 0.51 in terms of the average reflection density of the pattern, whereby the range of about 0.14 to about 1.21 in terms of the average reflection density of the pattern could be covered substantially continuously. Thus, for both of high and low density inks, efficient and effective control of the gradient has become possible by using an area in which the variation in the average reflection density of the formed pattern relative to the variation in dot diameter is relatively great and has a relatively good linearity, and more faithful reproduction of gradient has become possible and also more efficient image design has become possible. Incidentally, in the present embodiment, the orifice diameters of both the two heads 6 and 7 have been 50 $\mu$m. Also, the arrangement pitch of the dots has been 200 $\mu$m and therefore, the range of variation in the size of the dots used is about 80 $\mu$m to about 220 $\mu$m for the low density ink and about 180 $\mu$m to about 250 $\mu$m for the high density ink.

Description will now be made of an example of the control circuit for realizing the apparatus described above.

Figure 7:
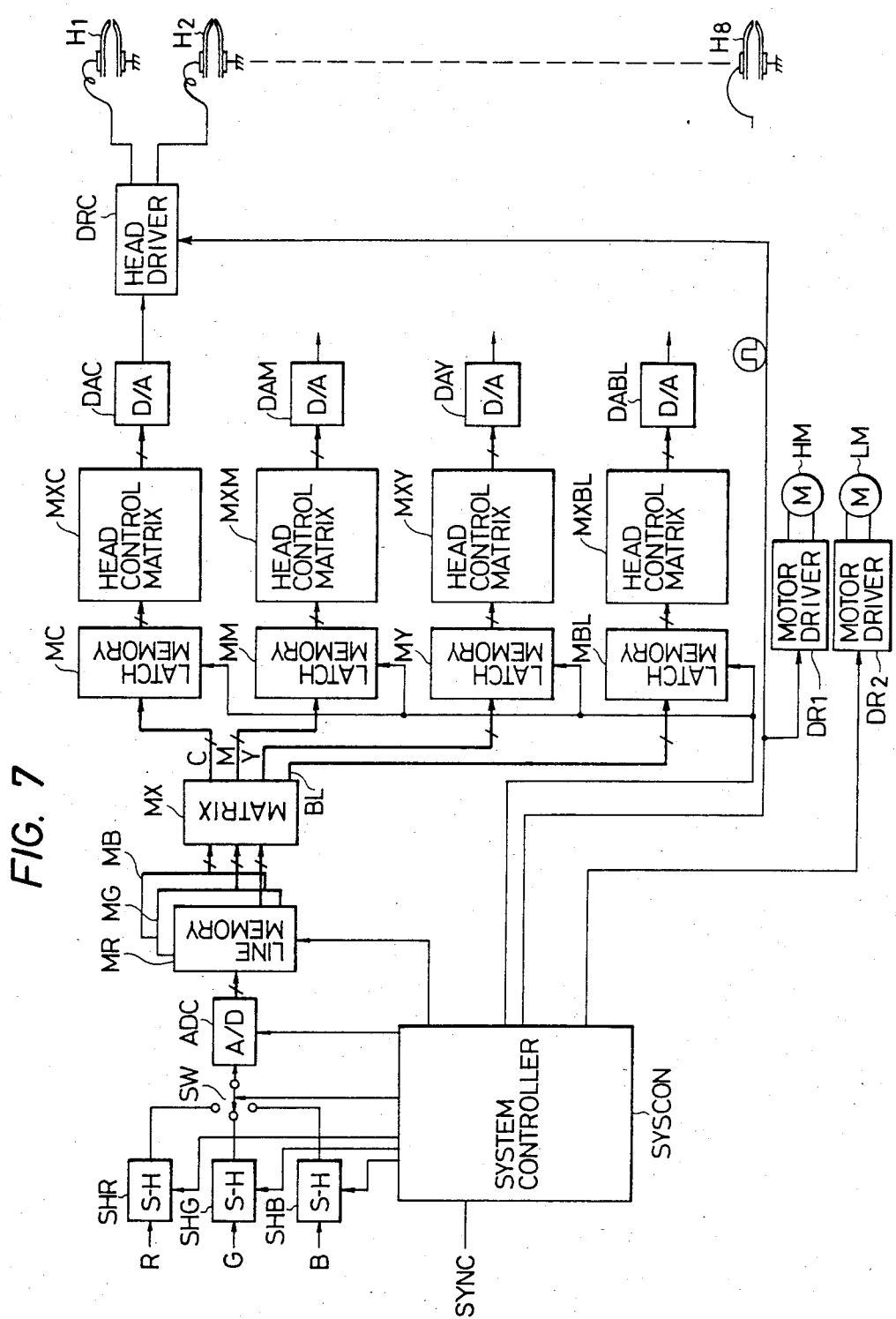
FIG. 7 is a control block diagram of a color video printer to which a first embodiment of the present invention is applied.

FIG. 7 shows an example of the control circuit in a case where the device of FIG. 5 is applied to a printer which prints out color video signals. In FIG. 7, image signals separated into three colors R, G and B are applied as inputs to sampling and holding circuits SHR, SHG and SHB, respectively, while, on the other hand, a synchronizing signal SYNC is applied as an input to a system controller SYSCON. Video signals are sampled and held in accordance with the timing signal from the system controller SYSCON. The sample output of each color video signal is stored in line memories MR, MG and MB through a signal change-over switch SW and an A/D converter ADC. Next, the information in the line memories MR, MG and MB is subjected to the masking process and the ground color removing process by a matrix circuit MX and at the same time, a cyan signal C, a magenta signal M, a yellow signal Y and a black signal BL are put out. The output signals C, M, Y and BL are stored in latch memories MC, MM, MY and MBL, respectively, the outputs of which in turn are applied as inputs to head control matrix circuits MXC, MXM, MXY and MXBL, respectively. These matrix circuits convert the output signals of the latch memories into code signals indicative of the head to be selected and the voltage value to be applied. The code signals are applied as inputs to D/A converters DAC, DAM, DAY and DABL and converted into analog voltage values thereby. These voltages are applied as inputs to head drivers DRC, DRM (not shown), DRY (not shown) and DRBL (not shown), and the head selected by a head selection signal HS is driven by a desired timing signal TP to control the amount of ink to be discharged.

Figure 8:
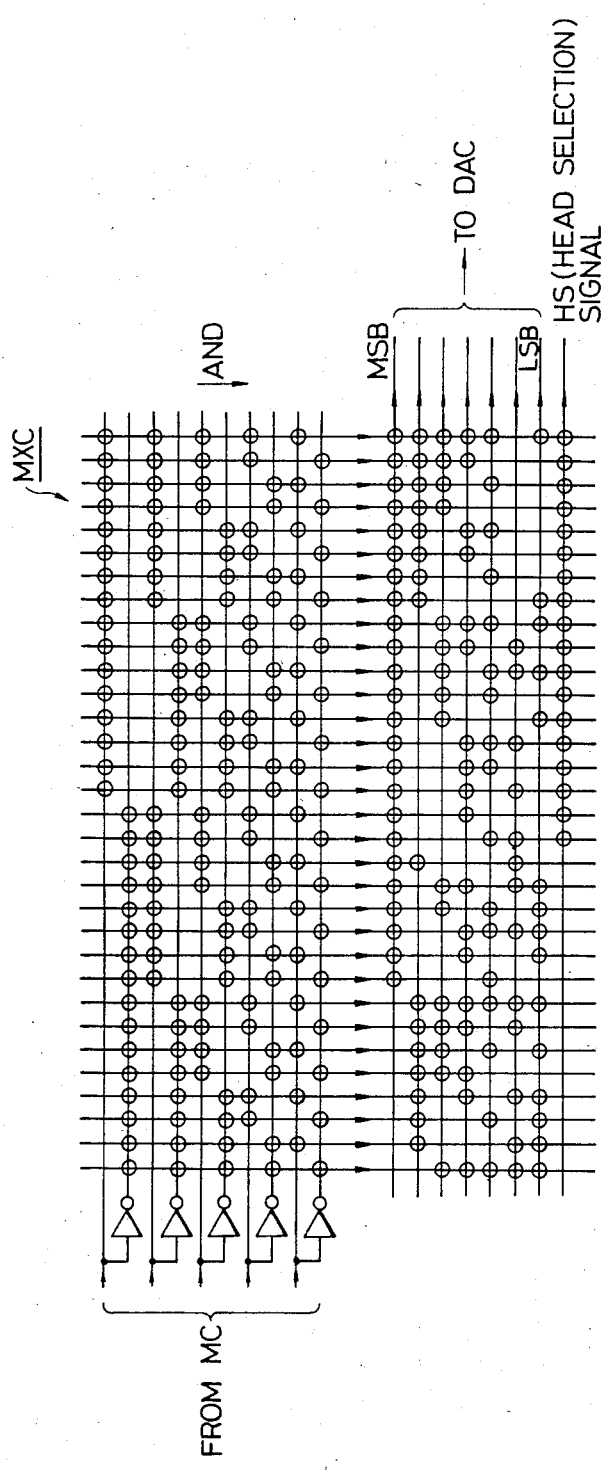
FIG. 8 is a detailed circuit diagram showing the interior of the head control matrix circuit MXC of FIG. 7.
Figure 9:
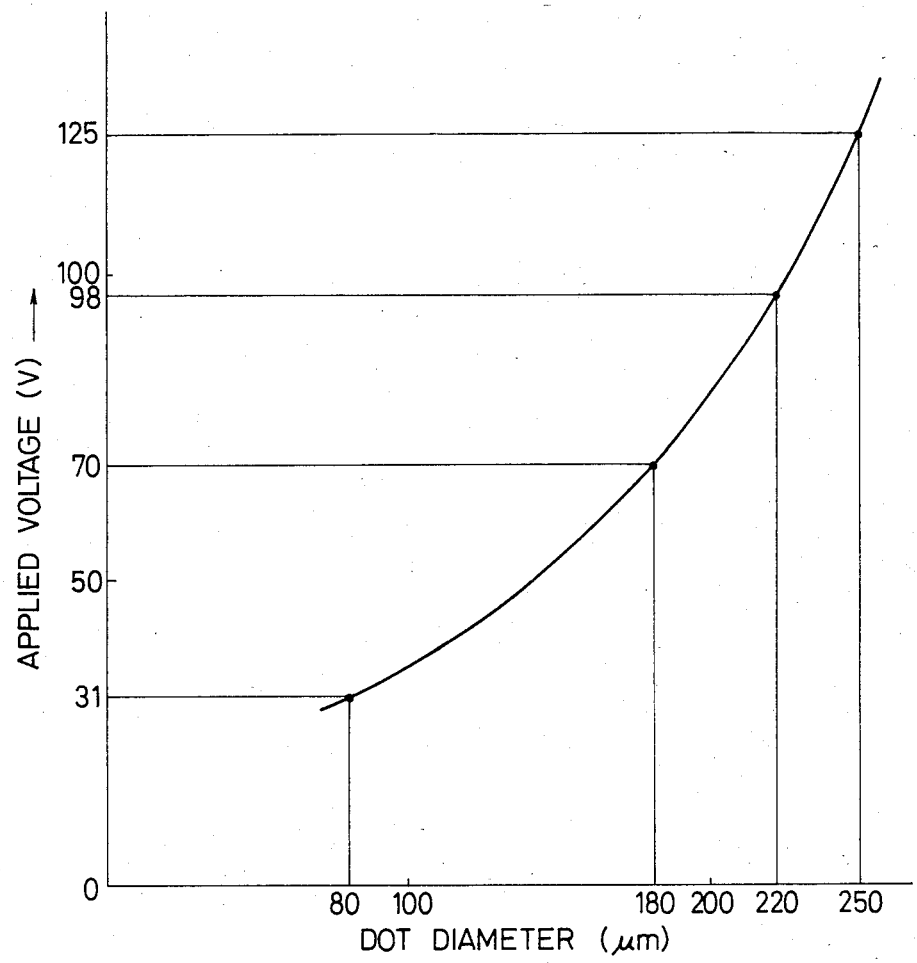
FIG. 9 is a graph of the dot diameter of a head for cyan ink versus applied voltage characteristic.

FIG. 8 shows the details of the interior of the head control matrix circuit MXC for cyan, and FIG. 9 shows the relation between the voltage applied to heads H1 and H2 discharging cyan ink, for example, and the dot diameter. In accordance with the value of a digital signal indicative of the density of cyan, the matrix circuit MXC puts out the head selection signal HS and the digital value of the applied voltage to each head determined from the characteristics shown in FIGS. 6 and 9.

FIG. 10 shows the relation between the input digital value obtained from the matrix circuit of FIG. 8 and the output code, the relation of the code to the selected head and the applied voltage, and the average optical reflection density obtained. In FIG. 10, reference character H1 designates a head for low density ink and reference character H2 denotes a head for high density ink.

The applied voltage to the head for low density ink is 30–98 V and the applied voltage to the head for high intensity ink is 70–125 V, whereby a range of variation of 80 $\mu$m–220 $\mu$m in terms of dot diameter (0.4–1.1 in terms of duty ratio and 0.14–0.51 in terms of the average reflection density of the pattern) can be obtained by the head for low density ink and a range of variation of 180 μm–250 μm in terms of dot diameter (0.9–1.25 in terms of duty ratio and 0.51–1.21 in terms of the average reflection density of the pattern) can be obtained by the head for high density ink. Also, even if the input digital value is "00000", small dots are formed by the low density ink to prevent creation of white cut-out portions. The signal from the system controller SYSCON is applied to a head motor HM and a paper feeding motor LM through drivers DR1 and DR2, whereby the head feeding and the paper feeding are controlled.

Figure 11:
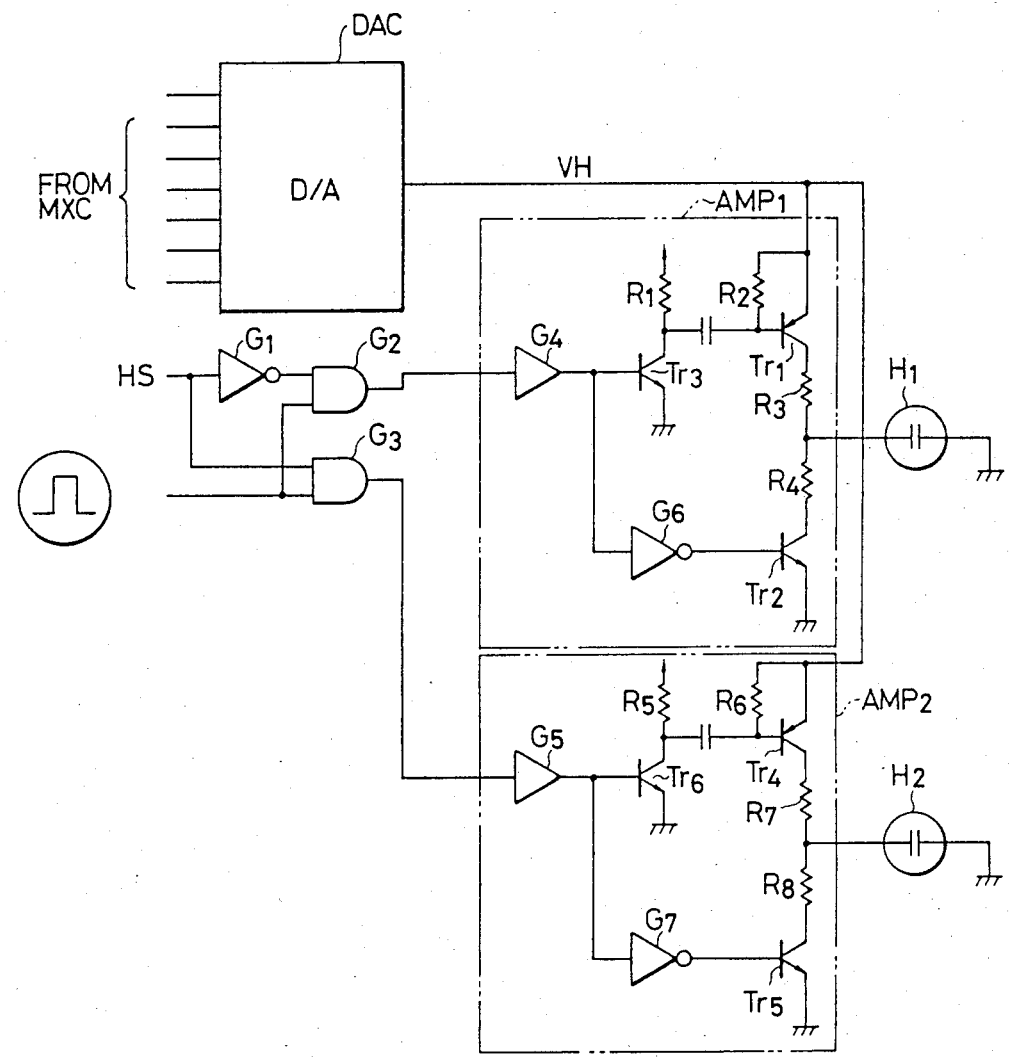
FIG. 11 is a detailed circuit diagram the head driving portion of FIG. 7.

FIG. 11 shows the details of the head driving portion of FIG. 7. The control of the ink jet head will hereinafter be specifically described by reference to FIG. 11 and with the cyan signal processing taken as an example. The 7-bit digital signal from the matrix circuit MXC of FIG. 7 is applied as an input to a D/A converter DAC for modulating the head applied voltage, and this converter produces a voltage VH corresponding to the digital signal. The head selection signal HS put out from the matrix circuit MXC is applied as an input to one input end of an AND gate G3 and to one input end of an AND gate G2 through an inverter G1. When the signal HS is at low level, the head H1 is selected and, when the signal HS is at high level, the head H2 is selected. The driving pulse of the head is applied as an input to the other input ends of the AND gates G2 and G3 from the system controller SYSCON. Description will now be made of the driving of the head H1 when the signal HS is at low level. One input end of the AND gate G2 is at high level and therefore, when the head driving pulse assumes high level, the output of the AND gate G2 assumes high level and the output of a buffer G4 assumes high level. Accordingly, a transistor Tr3 is turned on and a transistor Tr1 also is turned on. Hereupon, the voltage VH is applied to the head H1 through a resistor R3. Thus, the piezo vibrator contracts in the direction of inner diameter of the glass tube and a droplet of colored liquid is discharged therefrom. The amount of discharge of the droplet of colored liquid is controlled by the voltage VH.

At such time, a transistor Tr2 is turned off because the output of an inverter G6 is at low level. Subsequently, when the pulse has assumed low level, the transistor Tr1 is turned off and the transistor Tr2 is turned on, whereby the charge in the head H1 is discharged through a resistor R4 and the piezo element restores its original condition. In the manner described above, the discharge of ink drops is controlled.

Only the cyan ink has been described above, and control circuits are likewise constructed for magenta, yellow and black as well.

As described above in detail, according to the present embodiment, very efficient control of harmony level becomes possible and also faithful reproduction of harmony becomes possible. In addition, the construction of the circuit which converts image signals into driving signals for recording is very much simplified.

Figure 12:
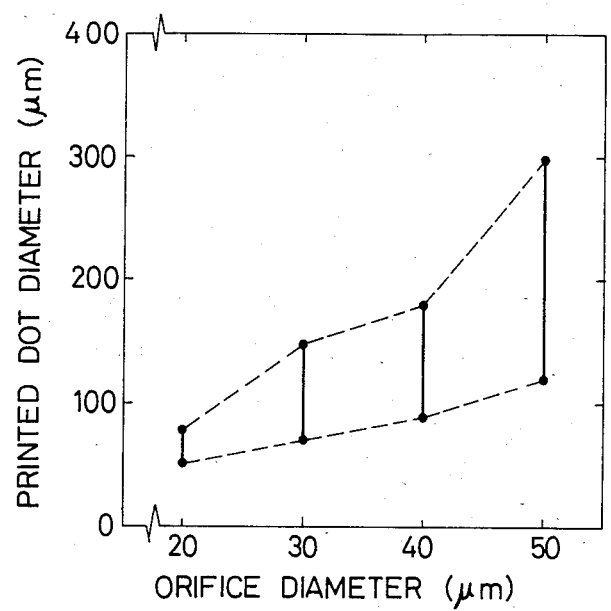
FIG. 12 shows the relation between the orifice diameter and the dot diameter in a second embodiment.

A second embodiment of the present invention will now be described. Again in this embodiment, use is made of the ink jet head shown in FIGS. 3A and 3B. As previously described, the size of the ink drop is varied by the voltage applied to the piezo element, but the size of the ink drop can be varied also by varying the inner diameter Id of the orifice portion (hereinafter referred to as the orifice diameter). FIG. 12 shows the printed dot diameter ranges when recording has been effected on predetermined recording paper by the use of ink jet heads having orifice diameters of 20 μm, 30 μm, 40 μm and 50 μm. As shown in FIG. 12, in the case of the head having the orifice diameter of 20 μm, the printed dot diameter range has been approximately φ50–80 μm, in the case of the head having the orifice diameter of 30 μm, the printed dot diameter range has been approximately φ70–150 μm, in the case of the head having the orifice diameter of 40 μm, the printed dot diameter range has been approximately φ90–180 μm, and in the case of the head having the orifice diameter of 50 μm, the printed dot diameter range has been approximately φ120–300 μm.

Thus, different orifice diameters result in different area ranges formable by the dots. Density gradient can be reproduced by controlling the size of the dots.

That is, in the case of an ink jet printer, multi-gradient can be reproduced by using a plurality of heads having different orifice diameters.

For example, by using heads having orifice diameters of 20 μm, 30 μm and 50 μm and varying the voltages applied to the respective heads, continuous gradient expression becomes possible from the dot diameter φ50 μm to φ300 μm.

This is because the head having the orifice diameter of 20 μm and the head having the orifice diameter of 30 μm overlap in the dot diameter range of φ70 μm–φ80 μm and the head having the orifice diameter of 30 μm and the head having the orifice diameter of 50 μm overlap in the dot diameter range of φ120 μm–φ150 μm. That is, by using recording heads in which the area ranges formable by the dots overlap, harmony can be continuously reproduced in a wide range.

Also, where dot diameters of φ50 to 180 μm are continuously varied, use is made of heads having the orifice diameters of 20 μm, 30 μm and 40 μm.

Figure 13:
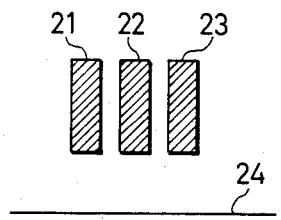
FIG. 13 shows the arrangement of heads and recording paper.

Each recording head thus selected is disposed in opposed relationship with recording paper 24, as shown in FIG. 13.

In FIG. 13, reference numeral 21 designates the ink jet head having the orifice diameter of 20 μm, reference numeral 22 denotes the ink jet head having the orifice diameter of 30 μm, and reference numeral 23 designates the ink jet head having the orifice diameter of 50 μm.

Figure 14:
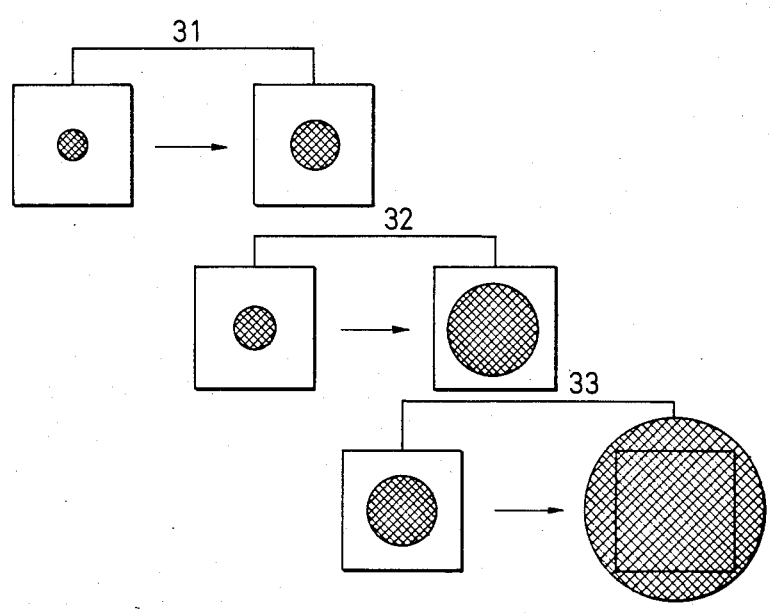
FIG. 14 is an enlarged view of a dot pattern formed by the use of the heads of FIG. 13.

As regards the dots recorded by the printer shown in FIG. 13, one picture element is formed by one dot as shown in FIG. 14.

In FIG. 14, reference numeral 31 designates a low density area recorded by the head 21 having the orifice diameter of 20 μm, a medium density area 32 is recorded by the head 22 having the orifice diameter of 30 μm, and a high density area 33 is recorded by the head 23 having the orifice diameter of 50 μm. Where the density areas that can be expressed by the heads overlap, one of the heads is selectively used.

A plurality of recording heads having different area ranges formable by the dots are used in this manner and the area range formable by one recording head and the area range formable by another recording head are continuous to each other or partly overlap each other and thus, a wide range of gradients can be obtained continuously.

Figure 15:
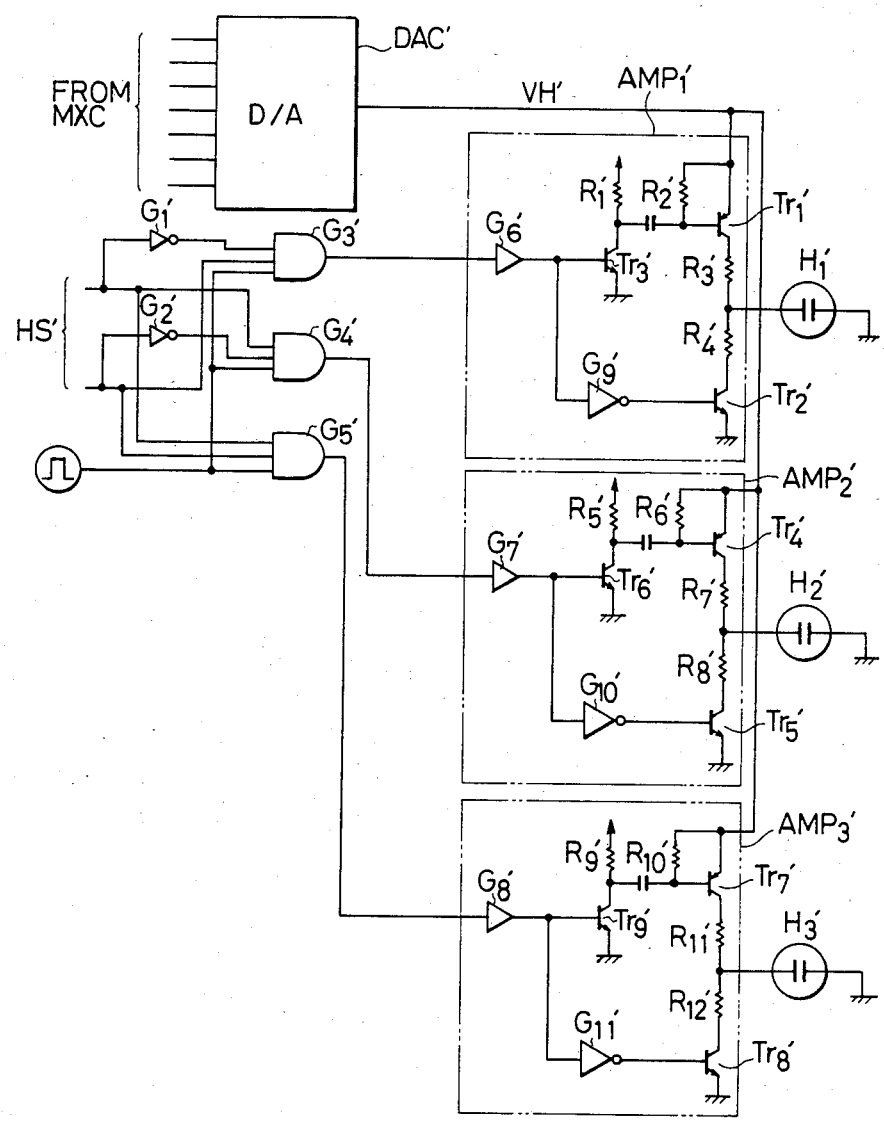
FIG. 15 is a diagram of a driving circuit for the heads of FIG. 13.

The present embodiment also is applicable to the video printer shown in FIG. 7. FIG. 15 shows the details of the head driving portion DRC when applied to the video printer. The example shown in FIG. 15 is one which uses three heads, i.e., a head H1' having an orifice diameter of 20 μm, a head H2' having an orifice diameter of 30 μm and a head H3' having an orifice diameter of 50 μm.

Control of the ink jet heads will now be specifically described by reference to FIG. 15 and with the cyan signal processing taken as an example. The 7-bit digital signal from the matrix circuit MXC shown in FIG. 7 is applied as an input to a D/A converter DAC' for modulating the voltage applied to the heads, and the D/A converter produces a voltage VH' corresponding to the digital signal. Also, the 2-bit head selection signal HS' put out from MXC' is applied as an input to inverters G1', G2' and AND gates G3', G4', G5'. When the signal HS' is "01", the head H1' is selected; when the signal HS' is "10", the head H2' is selected; and when the signal HS' is "11", the head H3' is selected. A head driving pulse is applied as an input to the other inputs of the AND gates G3', G4' and G5' from the system controller SYSCON. Description will now be made of the driving of the head H1' when the signal HS' is at low level. One end of the AND gate G2' is at high level and therefore, when the head driving pulse assumes high level, the output of the AND gate G3' assumes high level and the output of a buffer G6' assumes high level. Accordingly, a transistor Tr3' is turned on and a transistor Tr1' also is turned on. A voltage VH' is applied to the head H1' through a resistor R3'. Thus, the piezo vibrator contracts in the direction of inner diameter of the glass tube and a drop of colored liquid is discharged. The amount of discharge of the drop of colored liquid is controlled by the voltage VH'.

At such time, a transistor Tr2' is turned off because the output of an inverter G9' is at low level. Subsequently, when the pulse assumes low level, the transistor Tr1' is turned off and the transistor Tr2' is turned on, whereby the charge in the head H1' is discharged through a resistor R4' and the piezo element restores its original condition. In the manner described above, the discharge of the ink drop is controlled.

Only the cyan ink has been described above, but control circuits can be likewise constructed for magenta, yellow and black as well.

Third and fourth embodiments of the present invention will now be described. In these embodiments, an example in which recording heads having different density characteristics are arranged on the same major scanning line is shown.

Figure 16:
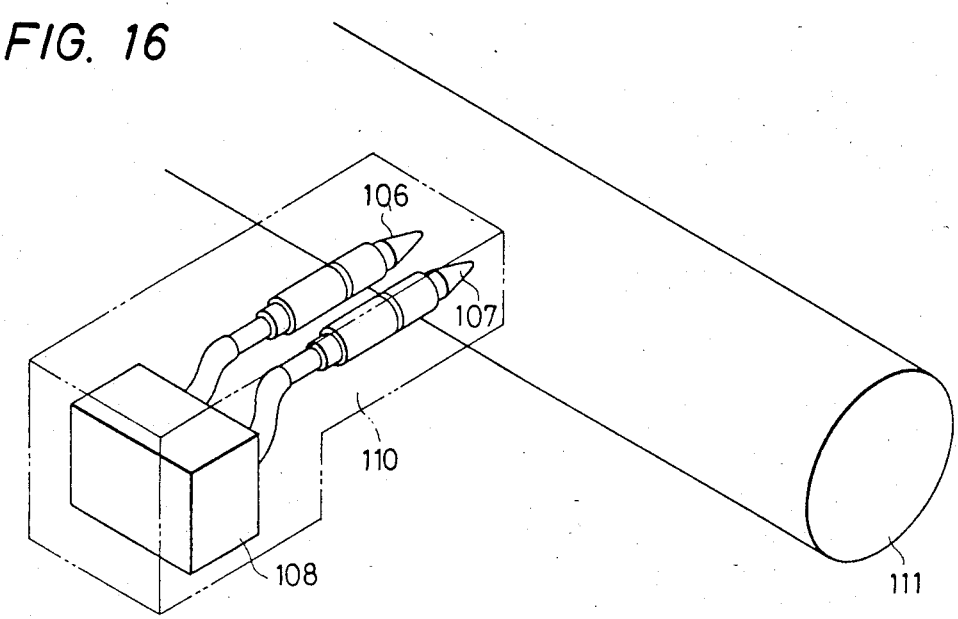
FIG. 16 shows the construction of heads according to a third embodiment.

First, FIG. 16 shows an ink jet printer using two heads 106 and 107 having different orifice diameters as ink jet heads to thereby enable reproduction of multi-gradient (third embodiment).

Figure 17:
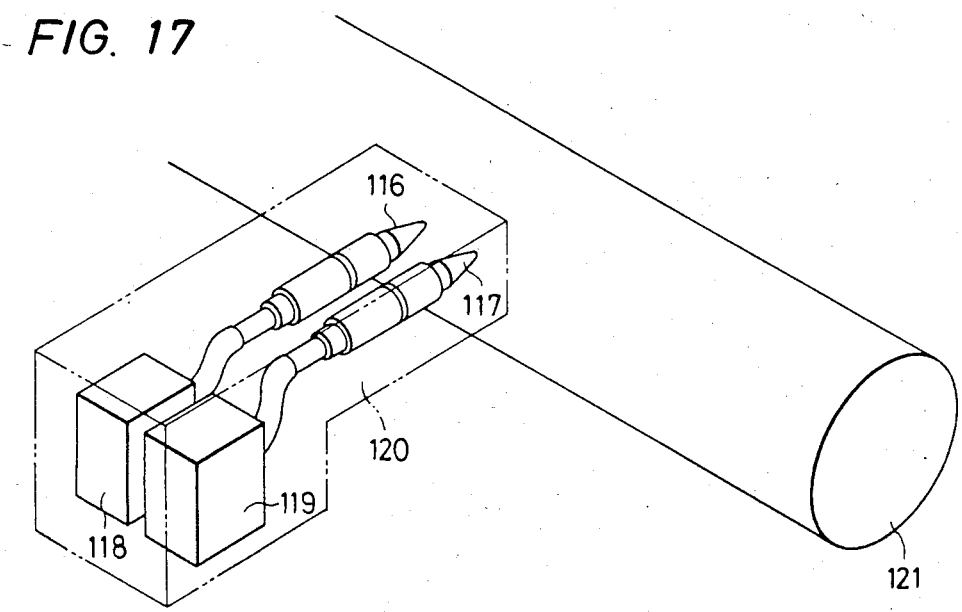
FIG. 17 shows the construction of heads according to a fourth embodiment.

Also, FIG. 17 shows an ink jet printer using two heads 116 and 117 and having an ink jet head unit 120 comprising ink tanks 118 and 119 containing therein inks of different densities (fourth embodiment).

Figure 18A:
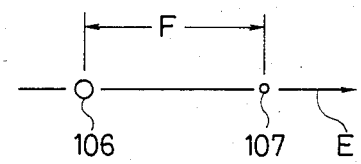
FIGS. 18A and 18B show the arrangement relation of heads.
Figure 18B:
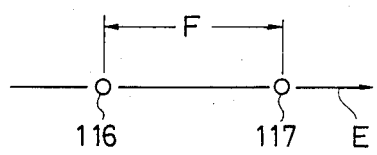

These heads 106, 107 and 116, 117 are arranged as shown in FIG. 18. In FIG. 18, reference character E designates the direction of movement of the heads, namely, the major scanning line direction. The distance F between the heads is determined as n bits when the distance between formed dots is one dot. Of course, n is determined by the dimensions of the heads and the number of picture elements to be formed and may be a positive integer, but if n is as small as possible, it will be advantageous because the memory capacity is reduced.

Figure 19:
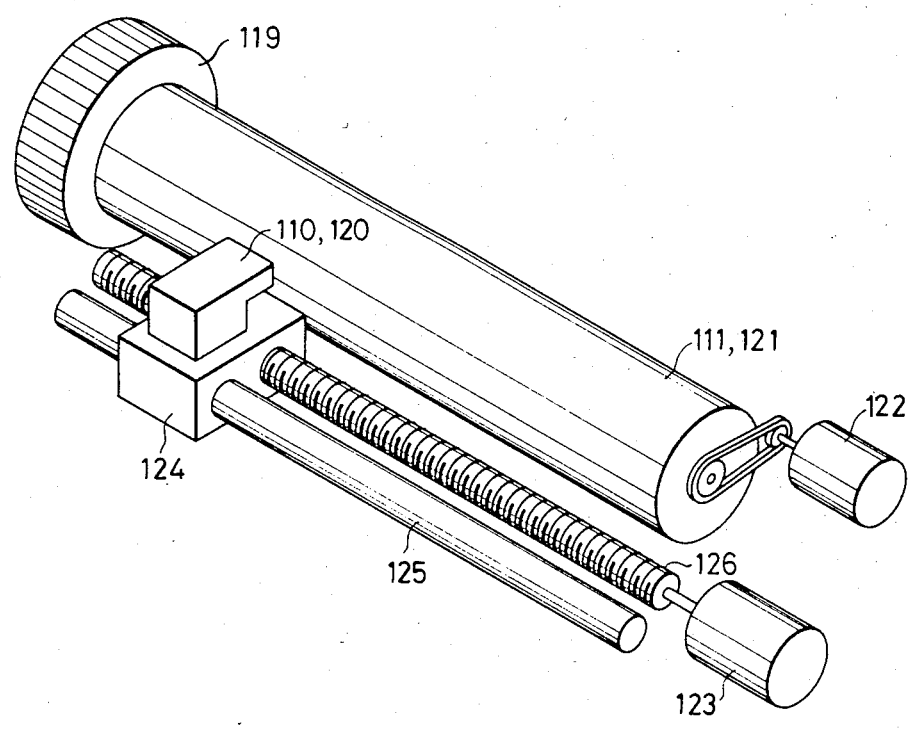
FIG. 19 shows the construction of the mechanical portion of a printer.
Figure 20:
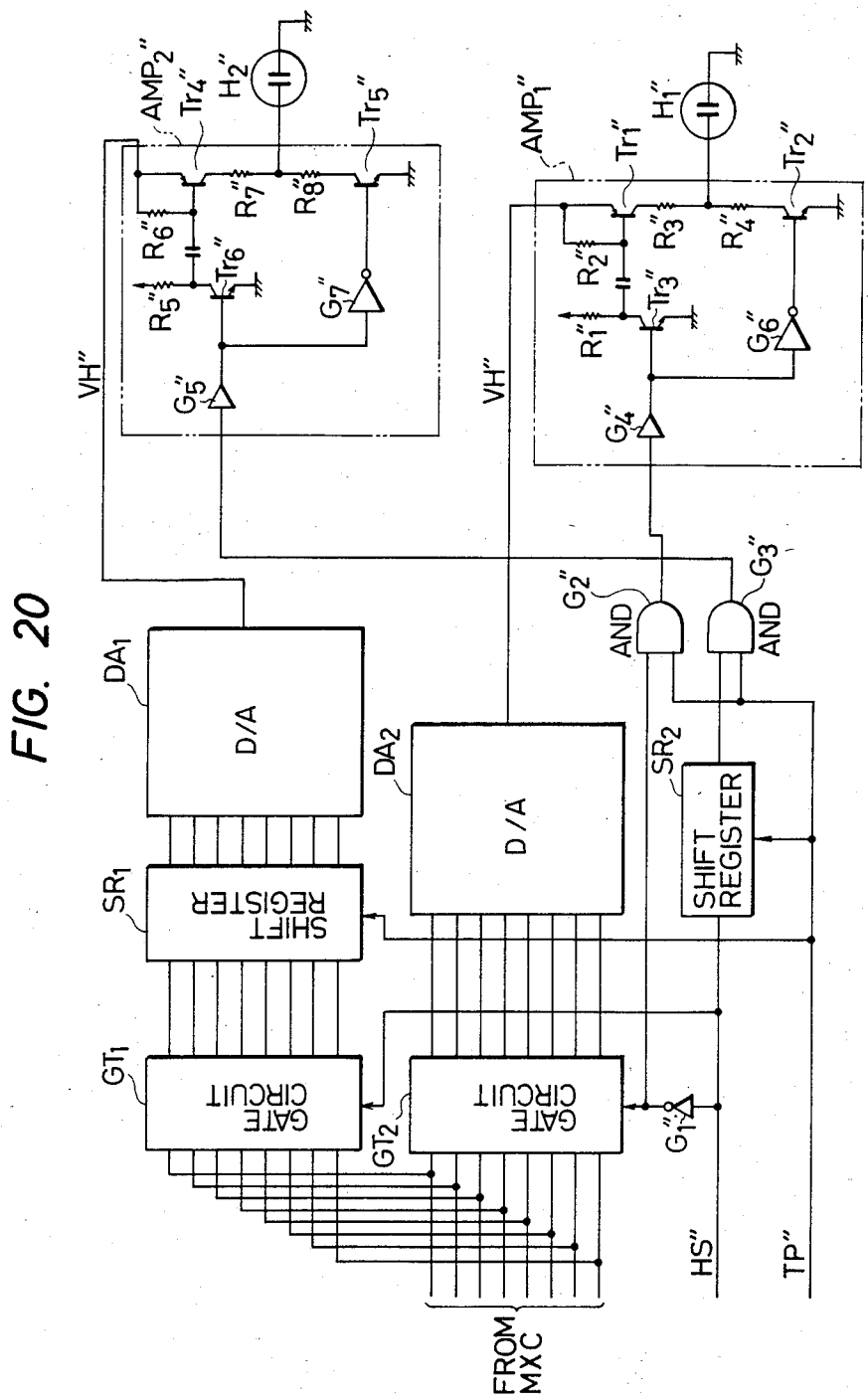
FIG. 20 is a detailed circuit diagram of a head driving portion.

FIG. 19 shows the construction of the mechanical portion of a printer in which the head unit 110 or 120 shown in FIG. 16 or 17 is mounted. In FIG. 19, reference numeral 121 designates a platen, reference numeral 122 denotes a paper feeding pulse motor, and reference numeral 123 designates a head feeding pulse motor for scanning a head carriage 124 having the head unit 110 or 120 mounted thereon by a guide 125 and a screw 126.

Where such printer is applied to a printer which prints out color video signals, the control block diagram of FIG. 7 can be used with the head driving portion being simply changed. FIG. 20 shows the details of the circuit of the head driving portion in the present embodiment.

Control of the ink jet heads will now be specifically described by reference to FIG. 20 and with the cyan signal processing taken as an example. The 8-bit digital signal from the matrix circuit MXC shown in FIG. 7 is applied as an input to gate circuits GT1 and GT2. If a head selection signal line HS" is at high level, the gate circuit GT1 opens and the signal is applied as an input to a parallel-input parallel-output shift register SR1. The shift register SR1 is shifted by one bit each by a timing pulse TP". The shift register SR1 is set to n steps because the two heads are spaced apart from each other by n bits.

Accordingly, when n timing pulses are generated, the output of the matrix circuit MXC is put out to a D/A converter DA1 and an analog signal corresponding to the digital value is obtained and applied as an input to the driving circuit AMP2" of the head H2" having a large orifice diameter.

Likewise, the head selection signal HS" also is applied as an input to an n-step shift register SR2 shifted by the timing pulses and therefore, when there is an output from the D/A converter DA1, an output is also obtained from an AND gate G3". In this manner, the head H2" having a large orifice diameter is driven with a delay corresponding to n timing pulses TP" after the signal has been put out from the matrix circuit MXC.

On the other hand, when the head selection signal HS" is at low level, a gate circuit GT2" opens and the output digital signal of the matrix circuit MXC is directly applied as an input to a D/A converter DA2. The head selection signal HS" also is directly applied as an input to an AND gate G2". Thus, the head H1" having a small orifice diameter is driven substantially simultaneously with the output of the matrix circuit MXC.

Description will now be made of the driving of the head H1" when the signal HS" is at low level. One end of the AND gate G2" is at high level and therefore, when timing pulse TP" assumes high level, the output of the AND gate G2" assumes high level and the output of a buffer G4" assumes high level. Accordingly, a transistor Tr3" is turned on and a transistor Tr1" also is turned on. Here, a voltage VH" is applied to the head H1" through a resistor R3". Thus, the piezo vibrator contracts in the direction of inner diameter of the glass tube and a drop of colored liquid is discharged. The volume of the drop of colored liquid is controlled by the voltage VH".

Also, at such time, a transistor Tr2" is turned off because the output of an inverter G6" is at low level. Subsequently, the output of the inverter G6" assumes high level and the output of the buffer G4" assumes high level.

Accordingly, the transistor Tr3" is turned on and the transistor Tr1" also is turned on. Here, the voltage VH" is applied to the head H1" through the resistor R3". Thus, the piezo vibrator contracts in the direction of inner diameter of the glass tube and a drop of colored liquid is discharged. The volume of the drop of colored liquid is controlled by the voltage VH".

Also, at such time, the transistor Tr2" is turned off because the output of the inverter G6" is at low level. Subsequently, when the pulse assumes low level, the transistor Tr1" is turned off and the transistor Tr2" is turned on, whereby the charge charged in the head H1" is discharged through a resistor R4" and the piezo element restores its original condition. In the manner described above, the discharge of ink drop is controlled.

Figure 21:
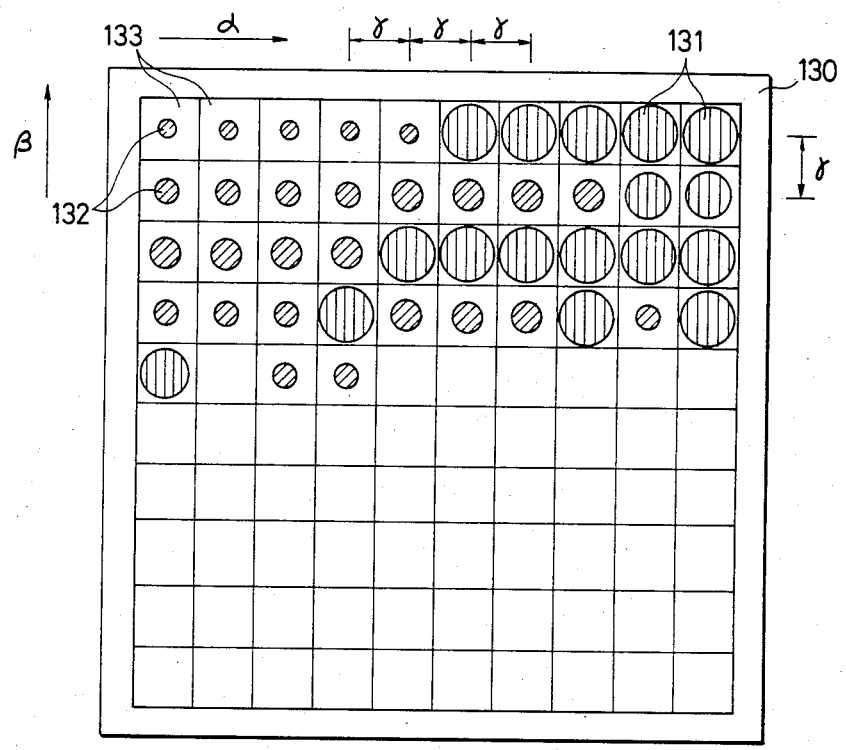
FIG. 21 is an enlarged view of an image formed by the printer of FIG. 19.

The image being thus formed is enlarged in FIG. 21. In FIG. 21, reference numeral 130 designates recording paper, reference numeral 131 denotes dots formed by the head having a large orifice, reference numeral 132 designates dots formed by the head having a small orifice, reference numeral 133 designates the smallest picture elements, $\alpha$ indicates the direction of movement of the heads (i.e., the major scanning direction), and $\beta$ indicates the direction of conveyance of the recording paper (i.e., the minor scanning direction). Since the timing pulse TP" of FIG. 20 is a clock signal of a predetermined frequency, the pitch $\gamma$ between the dots is always constant and a dot is formed within each smallest picture element 133 by either of the large and small heads.

For example, if the dot pitch $\gamma$ is 200 $\mu$m, an image of 5 dots/mm is obtained, but only one dot is formed within one picture element and therefore, the recording speeds of the recording heads are always equal and thus, the heads can be made integral with each other. Further, the same driving clock can be used for both heads and the circuit can be simplified. Also, the necessity of effecting solid print by small dots is eliminated and thus, a high speed can be achieved.

In the foregoing, the heads H1" and H2" have been described as heads having different orifice diameters, but a similar control circuit will also be constructed in case inks of different densities are used. Also, the number of heads has been shown as two, but three or more heads may be course of employed.

Although a shift register is used as the head spacing compensating means for compensating for the spacing between the heads, a mere delay circuit may also be employed as such means. All of the heads for various colors may be arranged on the same major scanning line, but a plurality of heads of different density characteristics for the various colors can be arranged on the same major scanning line.

Still another embodiment of the present invention will now be described. This embodiment is one in which use is made of an ink jet head using as the discharge driving force vapor bubbles produced in nozzles by heat energy. Such ink jet head is fully disclosed, for example, in German Laid-open patent application No. 2843064 (laid open on April 12, 1979) and therefore, the operational principle thereof need not be described herein.

Figure 22A:
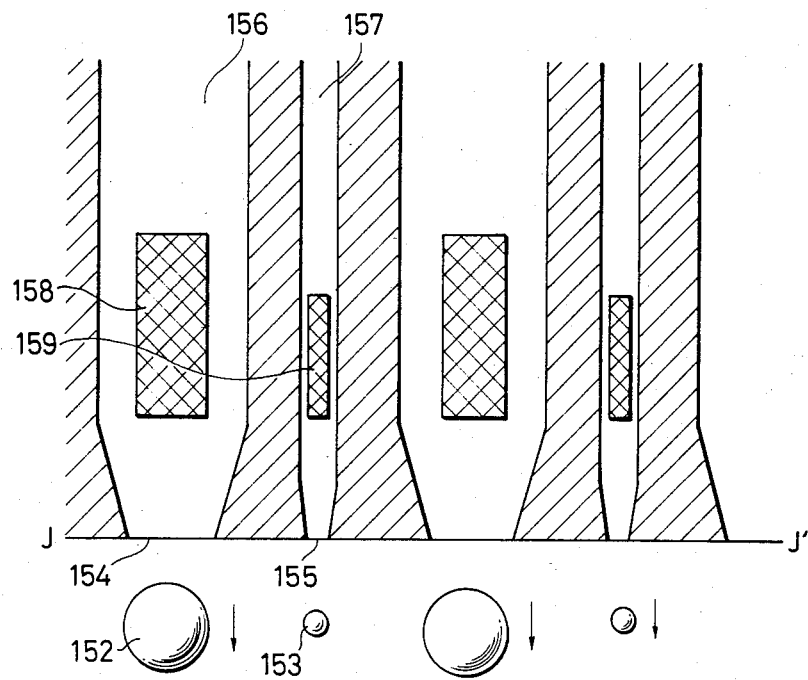
FIG. 22A is a cross-sectional view of an ink jet head according to another embodiment.
Figure 22B:
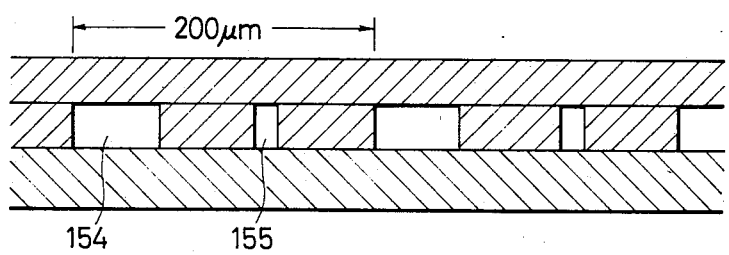
FIG. 22B shows the end surface at position J–J' of FIG. 22A.

FIG. 22A is a cross-sectional view of the ink jet head taken along a plane parallel to ink flow paths, and FIG. 22B shows a surface perpendicular to the ink flow paths at a position J-J' and illustrates the shapes of nozzle end portions (hereinafter referred to as the orifices) 154 and 155 through which large and small liquid drops 152 and 153 fly out. Ink is supplied from an ink reservoir, not shown, common to large and small nozzles 156 and 157. By a pulse-like voltage being applied to large and small heaters 158 and 159, vapor bubbles corresponding to the sizes of the large and small heaters, the supplied electric power and the power supply time are formed and large and small liquid drops 152 and 153 are discharged correspondingly to printing signals.

A method of making the head shown in FIG. 22 and a method of driving the same will now be described in detail. Large and small nozzles formed by layering $HfB_2$ as a resistor to a thickness of 1000 Å and Al as an electrode to a thickness of 5000 Å on an Si wafer formed thereon with $SiO_2$ of 3 $\mu$m by heat oxidation and forming large heaters of a size 40 $\mu$m×200 $\mu$m and small heaters of a size 20 $\mu$m×100 $\mu$m as shown in FIG. 22A are repeatedly arranged at a pitch of 200 $\mu$m. Tapered nozzles as shown in FIG. 22A were formed by layering $Al_2O_3$ as a protective film to a thickness of 2 $\mu$m by sputtering, thereafter layering photosensitive resin of a thickness of 30 $\mu$m and carrying out the photolithographic process. The width of the orifice portion of the large nozzle is 60 $\mu$m, the width of the flow path portion of the large nozzle is 100 $\mu$m, the width of the orifice portion of the small nozzle is 15 $\mu$m, and the width of the flow path portion of the small nozzle is 25 $\mu$m. The shape of the large orifices is a rectangle of 30 $\mu$m×60 $\mu$m, and the shape of the small orifices is a rectangle of 30 $\mu$m×15 $\mu$m. When a rectangular pulse of 3 KHz 5 $\mu$S was applied to both the large and small heaters, liquid drops of a diameter of 70 $\mu$m and liquid drops of a diameter of 20 $\mu$m were discharged from the large orifices 154 and the small orifices 155, respectively, in accordance with the signals.

As regards the dots printed on recording paper, the diameter of the large dot was 280 $\mu$m and the diameter of the small dot was 70 $\mu$m.

Figure 23:
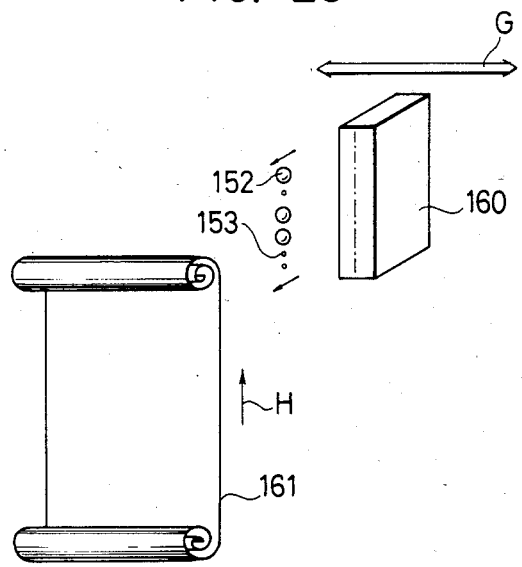
FIG. 23 is a schematic view of a printer using the ink jet head of FIGS. 22A and 22B.

FIG. 23 schematically shows the arrangement when large and small liquid drops 152 and 153 are recorded on recording paper 161 while an ink jet multinozzle head 160 comprising each fifty large and small nozzles arranged at a pitch of 200 $\mu$m is scanned in the direction of arrow G (the major scanning direction). Arrow H indicates the direction of conveyance of the recording paper (the minor scanning direction).

The smallest picture element on the recording paper is 200 $\mu$m×200 $\mu$m and therefore, an image of 5 dots/mm is obtained. The two large and small nozzles are arranged within 200 $\mu$m and, of the two large and small nozzles, at most one nozzle forms a dot, whereby at most one dot is always formed in the smallest picture element.

Figure 24A:
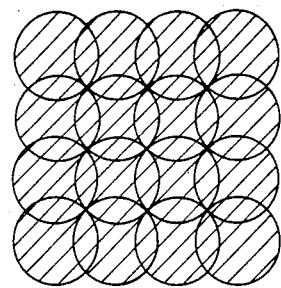
FIGS. 24A, 24B and 24C show examples of the dots formed according to the prior art.
Figure 24B:
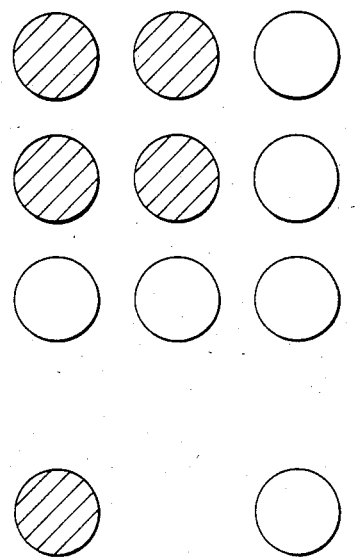
Figure 24C:

Now, where the light and shade of an image are expressed by only large dots as shown in FIGS. 24A, 24B and 24C a method is conceivable whereby the dot density is gradually decreased from solid black A to B and C, but where the light-colored portion is expressed by large dots as shown in FIG. 24C, large spots are sparsely scattered and become unsightly.

Also, when an attempt is made to express the solid black by only small dots, it is necessary to imprint sixteen spots in the smallest picture element of 200 $\mu$m×200 $\mu$m, and this greatly reduces the printing speed.

In contrast, according to the present embodiment, large and small dots are used properly and both the large and small dots are arranged substantially equidistantly on the recording paper, whereby the expression of a gradient becomes possible with the recording speed kept at the maximum frequency of each individual nozzle. Further, large dots which are unsightly in the expression of the light-colored portion can be replaced with small dots.

While the foregoing embodiment has been shown as an example in which large and small nozzles are arranged on the same base plate, a similar effect can be expected even if a base plate for forming a large nozzle thereon and a base plate for forming a small nozzle thereon are discretely used to effect the printing by two multiheads. Further, a nozzle arrangement in which large and small nozzles are made integral with each other in two stages is also of course possible. The sizes of the nozzles are not limited to two kinds, i.e., large and small, but may also be three kinds, i.e., large, medium and small, or more.

In the present embodiment, the ratio of the numbers of large and small nozzles is 1:1, but no problem will occur if the spatial frequency of the large dot on the recording paper in which the density is maximum is substantially equal to the spatial frequency of the small dot. Accordingly, the ratio of the numbers of nozzles may be within the range of ½–2. Also, large and small nozzles have been shown as an example, but such nozzles are also applicable where inks of different densities are used.

As described above, the image forming apparatus according to the present embodiment uses a plurality of recording heads for forming dots of different density characteristics and the minimum spacing between the formed dots is substantially constant and therefore, images excellent in harmony can be obtained without the recording speed of the recording heads being reduced.

Figure 25:
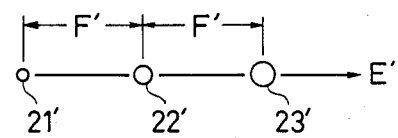
FIGS. 25 and 26 show the head arrangements according to still further embodiments.

FIG. 25 shows a fifth embodiment of the present invention. In FIG. 25, reference numerals 21', 22' and 23' correspond to the heads 21, 22 and 23, respectively, of FIG. 13. The head 21' is an ink jet head having an orifice diameter of 20 μm, the head 22' is an ink jet head having an orifice diameter of 30 μm, and the head 23' is an ink jet head having an orifice diameter of 50 μm. Accordingly, the dots formed by the heads 21', 22' and 23' have the characteristic as shown in FIG. 12 wherein the dot diameters overlap. The heads 21', 22' and 23' are arranged in a row in the major scanning direction E', with an equal spacing F' therebetween. F' is determined as n'f', where f' is the distance between the dots formed and n' is a positive integer. As small a number as possible is chosen as n' to reduce the memory capacity as much as possible. The heads 21', 22' and 23' shown in FIG. 25 are driven by the circuit shown in FIG. 20. In FIG. 20, only two heads are shown, but the circuit of FIG. 20 can be applied by providing therein a gate circuit, a shift register, a D/A converter and an amplifier. Accordingly, the minimum spacings between the dots formed are also set equally.

Figure 26:
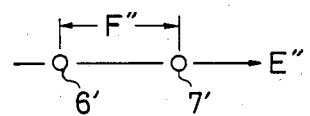

FIG. 26 shows a sixth embodiment of the present invention. In FIG. 26, reference numerals 6' and 7' correspond to the heads 6 and 7, respectively, of FIG. 4. The heads 6' and 7' are driven by the circuit shown in FIGS. 7 and 8. That is, an area in which the variation in gradient level is great relative to the variation in size of the dots formed by the heads 6' and 7' is used for image reproduction. Moreover, the heads 6' and 7' are arranged in a row along the major scanning direction E'', and the spacing F'' between the heads 6' and 7' is determined as n''f'', where f'' is the distance between the dots and n'' is a positive integer. Since n'' is set to a number smaller than 100, the memory capacity is further reduced. The heads 6'' and 7'' are driven by the circuit shown in FIG. 20 and therefore, the minimum spacings between the dots formed are set equally. As described above, according to the fifth and sixth embodiments, the harmony reproduction range is widened and a reduction in the memory capacity for recording becomes possible. Also, these embodiments are very advantageous in recording speed.

According to the present invention, as described above in detail, when image formation using dots is effected, very efficient control of gradient level becomes possible and also high fidelity reproduction of the gradient or harmony becomes possible. Also, the construction of the circuit for converting an input signal into a driving signal for recording is simplified. Further, the gradient reproduction range can be widened and continuous gradient reproduction becomes possible. Also, by making the minimum spacing between formed dots substantially constant, images excellent in density harmony can be obtained without the recording speed being reduced.

Herein, the present invention has been described with an ink jet printer taken as an example, whereas the present invention is not restricted thereto but is applicable even to dot printers such as electrostatic printers, thermal printers and thermal transfer printers which are capable of expressing dots of different density characteristics.

The present invention is not restricted to the above-described embodiments, but various applications and modifications may be made therein within the scope of the invention as defined in the appended claims.

What is claimed is:

1. An image forming method for forming on a medium an image pattern comprising a plurality of picture elements with different light-reflecting properties providing different optical reflection densities by using pattern elementary marks on the medium at a substantially constant pitch to form the picture elements, the method comprising the steps of:

determining within which of a first optical reflection density range and a second optical reflection density range the optical reflection density of an area of the image pattern falls, the first range having an upper limit higher than the lower limit of the second range;

providing a pattern elementary mark with a first density when the optical reflection density of an area of the image pattern to be depicted thereby is in the first optical reflection density range, the pattern elementary mark having a size that provides the image area depicted thereby an optical reflection density substantially the same as the determined optical reflection density;

providing a pattern elementary mark with a second density higher than the first density when the optical reflection density of an area of the image pattern to be depicted thereby is in the second optical reflection density range, the pattern elementary mark having a size that provides the image area depicted thereby with an optical reflection density substantially the same as the determined optical reflection density; and setting the optical reflection density ranges so that efficient representation of the optical reflection densitites of the image pattern throughout the image can be performed by the pattern elementary marks having the first and second densities.

2. An image forming apparatus for performing the method according to claim 1, comprising:

a first ink jet head for providing the pattern elementary mark with the first density; and a second ink jet head for providing the pattern elementary mark with the second density.

3. An image forming apparatus according to claim 2, wherein each said ink jet head includes a piezo element, and the size of said pattern elementary marks is determined by the a voltage applied to said piezo element.

4. An image forming method for forming on a medium an image pattern comprising a plurality of picture elements with different light-reflecting properties providing different optical reflection densities by using pattern elementary marks on the medium at a substantially constant pitch to form the picture elemtns, the mehtod comprising the steps of:

determining within which of a first optical reflection density range and a second optical reflection density range the optical reflection density of an area of the image pattern falls, the first range having an upper limit higher than the lower limit of the second range;

providing a pattern elementary mark with a first density when the optical reflection density of an area of the image pattern to be depicted thereby is in the first optical reflection density range, the pattern elementary mark having a size that provides the image area depicted thereby with an optical reflection density substantially the same as the determined optical reflection density;

providing a pattern elementary mark with a second density higher than the first density when the optical reflection density of an area of the image pattern to be depicted thereby is in the second optical reflection density range, the pattern elementary mark having a size that provides the image area depicted thereby with an optical reflection density substantially the same as the determined optical reflection density; and setting the ratio of the maximum size of the pattern elementary mark with the first density to the pitch thereof to less than 1.4.

5. An image forming method accordind to claim 4, wherein in the first optical reflection density range a plot of the sizes of pattern elementary marks having the first density, versus the optical reflection densities provided thereby, results in a substantially linear curve.

6. An image forming method according to claim 4, wherein said ratio is 1.25 or less.

7. An image forming method according to claim 4, wherein said pattern elementary marks are circular.

* * * * *

UNITED STATES PATENT AND TRADEMARK OFFICE
CERTIFICATE OF CORRECTION

PATENT NO. : 4,604,654

DATED : August 5, 1986

INVENTOR(S) : NOBUAKI SAKURADA, ET AL.

It is certified that error appears in the above-identified patent and that said Letters Patent is hereby corrected as shown below:

COLUMN 4

Line 57,   "diagram" should read --diagram of--.

COLUMN 5

Line 43,   "duty ratio of dot" should read --dot duty ratio--.
    Line 44,   "duty ratio of dot" should read --dot duty ratio--.
    Line 50,   "duty" should read --dot--.
    Line 51,   "ratio of dot" should read --duty ratio--.

COLUMN 13

Line 11,   "is enlarged" should read --is shown enlarged--.
    Line 40,   "may be course of employed" should read --may of course be employed--.

COLUMN 17

Line 8,    "the a" should read --the--.
    Line 14,   "elemtns" should read --elements--.
    Line 15,   "mehtod" should read --method--.

UNITED STATES PATENT AND TRADEMARK OFFICE
CERTIFICATE OF CORRECTION

PATENT NO. : 4,604,654

DATED : August 5, 1986

INVENTOR(S) : NOBUAKI SAKURADA, ET AL.

It is certified that error appears in the above-identified patent and that said Letters Patent is hereby corrected as shown below:

COLUMN 18

Line 16, "accordind" should read --according--.

Signed and Sealed this

First Day of September, 1987

*Attest:*

DONALD J. QUIGG

*Attesting Officer*    *Commissioner of Patents and Trademarks*

UNITED STATES PATENT AND TRADEMARK OFFICE
CERTIFICATE OF CORRECTION

PATENT NO. : 4,604,654

DATED : August 5, 1986

INVENTOR(S) : NOBUAKI SAKURADA, ET AL.

It is certified that error appears in the above-identified patent and that said Letters Patent is hereby corrected as shown below:

COLUMN 16

Line 67, "2." should read --6.--.

Line 68, "1" should read --1 or 2--.

COLUMN 17

Line 5, "3." should read --7.--;

"2" should read --6--.

Line 9, "4." should read --2.--.

COLUMN 18

Line 16, "5." should read --3.--;

"4" should be --2--.

Line 21, "6." should read --4.--;

"4" should read --2--.

Line 23, "7." should read --5.--

"4" should read --2--.

Signed and Sealed this

Tenth Day of December, 1991

*Attest:*

HARRY F. MANBECK, JR.

*Attesting Officer*        *Commissioner of Patents and Trademarks*